Figure 1:
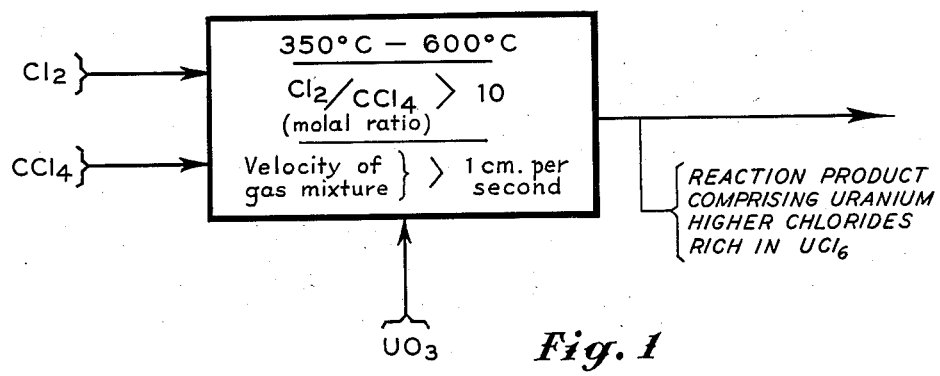

March 7, 1950     H. G. REIBER     2,499,836

PREPARATION OF HIGHER CHLORIDES OF URANIUM

Filed Sept. 13, 1944

INVENTOR.
HAROLD G. REIBER
BY
ATTORNEY.

Patented Mar. 7, 1950

2,499,836

UNITED STATES PATENT OFFICE 2,499,836

PREPARATION OF HIGHER CHLORIDES OF URANIUM

Harold G. Reiber, Davis, Calif., assignor to the United States of America as represented by the United States Atomic Energy Commission Application September 13, 1944, Serial No. 553,924

12 Claims. (Cl. 23—14.5)

This invention relates to the production of uranium hexachloride. More particularly, it relates to the production of a mixture of higher chlorides of uranium in which uranium hexachloride is the principal uranium chloride constituent by the treatment of a uranium oxide-containing material with a gaseous mixture comprising chlorine and carbon tetrachloride at an elevated reaction temperature. Still more particularly, it relates to a process of the aforementioned nature in which the preferred starting material comprises uranium trioxide.

There is a present need for large quantities of uranium hexachloride. This recently discovered substance is an iridescent dark green crystalline material having a vapor pressure of approximately 1 to 3 mm. Hg at 100° C. It decomposes rapidly under ordinary atmospheric conditions, i. e., in the presence of moist air, but is stable in vacuum and in dry air, nitrogen, helium, and the like, at ordinary room temperature. It is comparatively soluble in carbon tetrachloride. Its preparation by a method involving the disproportionation of uranium pentachloride by heating the latter compound in a suitable still at temperatures of approximately 80° to 180° C. and at absolute pressures of the order of $10^{-6}$ to $10^{-3}$ mm. Hg is described and claimed in the copending application by Francis A. Jenkins, Serial No. 494,447, filed July 13, 1943. However, uranium pentachloride is not as satisfactory a starting material for the preparation of the hexachloride as could be desired because the theoretical yield of the hexachloride prepared in this manner is only 54.3% by weight (50 mol per cent) of the pentachloride, thus indicating that the well-known compound $UCl_5$ may be represented by the formula, $UCl_4 \cdot UCl_6$. Furthermore, the uranium pentachloride itself must first be prepared, such as by a separate step of chlorinating uranium oxide. The direct preparation of uranium hexachloride from the more readily available uranium compounds, such as uranium oxide, is therefore a desideratum.

I have discovered that by passing a mixture of chlorine gas and carbon tetrachloride vapor over uranium oxides, particularly uranium trioxide, under carefully controlled conditions, I may obtain good yields of a composition comprising higher chlorides of uranium having a high content of uranium hexachloride.

I am aware that it has been suggested previously to react various oxides of uranium with chlorine and with carbon tetrachloride vapor at elevated temperatures. For example, Marden, U. S. P. 1,646,734, dated October 25, 1927, treats thorium dioxide while in admixture with carbon with a mixture of chlorine and carbon tetrachloride vapor "as a bright red heat" with the production of thorium chloride, $ThCl_4$, and suggests that uranium chloride may be similarly prepared. Michael and Murphy, Amer. Chem. J., 44, 384 (1910), treat various oxides of uranium with a solution of chlorine in carbon tetrachloride under liquid phase conditions, with the formation of uranium tetrachloride and uranium pentachloride. Referring to the work of Camboulives (Compt. Rend., 150, 175; 1910), Mellor, in "A Comprehensive Treatise on Inorganic and Theoretical Chemistry," XII, 57 and 80 (1932), discloses that it is old broadly to react carbon tetrachloride vapor with $UO_3$ at elevated reaction temperatures, $UCl_4$ and $UCl_5$ being formed. Mellor also refers (page 57) to the work of Quantin (Compt. Rend. 106, 1074 at 1075; 1888) indicating that carbon tetrachloride reacts at high temperature upon $UO_3$ to give "a mixture of uranyl dichloride and uranium hexachloride," but this appears unquestionably to be an erroneous interpretation of Quantin's original publication which states merely of the action of carbon tetrachloride: "l'acide d'uranium donne pareillement un mélange d'oxychlorure et de chlorure d'uranium." It may also be pointed out that Gmelin, "Handbuch der Anorganischen Chemie," 8th ed., System No. 55, page 98 (1936), cites the same Quantin publication as showing the production of $UO_2Cl_2$ and $UCl_4$. Finally, Rideal, J. Soc. Chem. Ind., 33, 673 at 674 (1914), suggests the preparation of uranium tetrachloride by passing a current of chlorine saturated with carbon tetrachloride vapor over a mixture of uranium oxide and sugar carbon at "low red heat." Uranium pentachloride is said to be produced with the tetrachloride. However, so far as I am aware, it has never been reliably reported in the literature that the treatment of uranium oxides with chlorine and/or carbon tetrachloride yields any uranium chlorides other than the tetrachloride and/or the pentachloride.

An object of my invention is the preparation of uranium hexachloride from uranium oxide.

Another object of my invention is the conversion of uranium oxide to a composition comprising higher chlorides of uranium that is characterized by its high content of uranium hexachloride.

A further object of my invention is the conversion of uranium oxide, and particularly the trioxide, to uranium hexachloride by a method that is simple and capable of close control of the reaction conditions.

I have discovered that by reacting uranium oxide, and particularly uranium trioxide, with a mixture of chlorine gas and carbon tetrachloride vapor under carefully controlled conditions, I may obtain as reaction products compositions comprising a mixture of higher chlorides of uranium in which the uranium hexachloride content is of the order of 70 to 75% or higher by weight. As a result of my research, I have established that this advantageous result apparently depends primarily upon controlling closely the molal ratio between the chlorine and carbon tetrachloride present in the gaseous mixture employed for the reaction, and to a somewhat lesser extent upon the linear velocity with which the gaseous mixture is passed over the uranium oxide undergoing reaction. For reaction temperatures in the range of approximately 350° to 600° C., and preferably in the range of approximately 375° to 550° C., I have found that particularly favorable results are obtained when the $Cl_2/CCl_4$ molal ratio is above 10, and preferably above 15, and with linear velocities of the gas mixture of at least 1 cm. per second, and preferably in the range of approximately 1 to 7 cm. per second.

Figure 2:
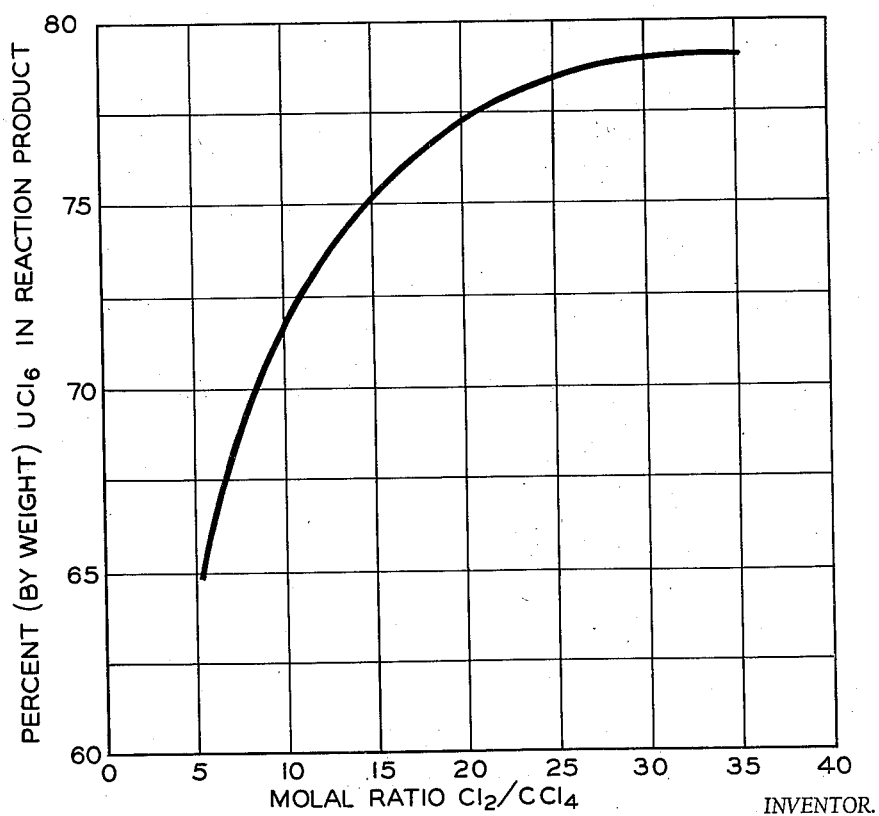

In the accompanying drawing, Fig. 1 is a schematic representation of the procedure upon which the invention is largely based, applied to uranium trioxide as starting material for purposes of illustration. Fig. 2 is a curve showing average results obtained upon treating uranium trioxide in accordance with the invention, and expressed in terms of the $UCl_6$ content of the reaction product plotted as a function of the $Cl_2/CCl_4$ molal ratios of the gas mixtures employed for reaction.

Having described the invention in its broader aspects, I now give more detailed examples of procedure in accordance therewith in order to assist in a still better understanding of its various ramifications, it being understood that this is included herein for purposes of illustration rather than limitation. Parts are by weight unless otherwise indicated.

Example 1

Approximately 10 parts of uranium trioxide in finely subdivided form were placed in a thermally-resistant reaction tube disposed within an electrically heated furnace. The exit end of the reaction tube communicated with a relatively large air-cooled product receiver which in turn communicated with a water-cooled condenser leading to a hood for safely removing non-condensable gases from the system. The feed end of the reaction tube communicated with an arrangement for admitting substantially anhydrous chlorine gas and substantially anhydrous and oxygen-free carbon tetrachloride vapor to the reaction zone in closely controlled quantities. The feed end of the reaction tube also communicated with a source of dry carbon dioxide gas.

After placing the charge of uranium trioxide in the reaction tube situated within the furnace, and while bringing the furnace up to a reaction temperature of approximately 375° C., a current of dry $CO_2$ was passed through the apparatus during a total period of one to three hours to substantially completely dry the charge and to sweep out substantially all residual moisture within the system. Chlorine gas and carbon tetrachloride vapor were then admitted to the reaction zone and passed over the heated charge. The linear velocity of the gas mixture and the molal ratio of the components thereof were as indicated hereinafter.

Upon admitting the chlorine gas to the reaction zone at the rate of approximately 87 parts per hour and the carbon tetrachloride vapor in admixture therewith at the rate of approximately 7.1 parts per hour, corresponding to a $Cl_2/CCl_4$ molal ratio of approximately 26.6, and passing the gaseous mixture over the charge of uranium trioxide at approximately 375° C. with a linear velocity of approximately 3.7 cm. per second, the charge of uranium trioxide was substantially completely converted into higher chlorides of uranium, the reaction product in vapor form passing over into the product receiver where it was condensed. The product recovered from the product receiver analyzed 78.4% uranium hexachloride.

The foregoing procedure with uranium trioxide as starting material was repeated, but with different reaction conditions. For the sake of brevity the procedural details are omitted, and the results of a number of representative runs are shown directly in tabulated form:

*Table I*

| Example | Charge, Parts | $Cl_2$, Parts per Hour | $CCl_4$, Parts per Hour | Temp., °C. | Approx. Molal Ratio $Cl_2/CCl_4$ | Linear Velocity, cm./Sec. | Per Cent $UCl_6$ in Product (Calculated) |
|---|---|---|---|---|---|---|---|
| II | 10 | 87 | 11.2 | 375 | 16.8 | 3.8 | 77.7 |
| III | 8 | 87 | 17.6 | 375 | 10.7 | 3.9 | 74.4 |
| IV | 10 | 87 | 5.8 | 440 | 32.5 | 4.1 | 79.2 |
| V | 8 | 87 | 17.0 | 525 | 11.1 | 4.8 | 71.0 |
| VI | 10 | 72.5 | 9.2 | 440 | 17.1 | 3.5 | 74.6 |
| VII | 10 | 145 | 5.8 | 440 | 54.2 | 6.7 | 76.5 |
| VIII | 8 | 43.5 | 15.7 | 440 | 6.0 | 2.3 | 69.5 |

The results of the foregoing examples (except Example VII for reasons to be mentioned below), as well as the results of other runs under a variety of operating conditions, are plotted in Fig. 2 in terms of the weight per cent of $UCl_6$ in the reaction product versus the $Cl_2/CCl_4$ molal ratio. From the data obtained, it is apparent that the molal ratio of chlorine to carbon tetrachlorine in the gaseous mixture employed for the reaction greatly influences the uranium hexachloride content of the product obtained. It will be noted from Fig. 2 that, generally speaking, molal ratios of $Cl_2/CCl_4$ of approximately 10 or higher, a reaction product is obtained that comprises higher chlorides of uranium in which the uranium hexachloride content is of the order of 70% or better.

It will be noted that the curve has not been extended to the right sufficiently far to include high molal ratios corresponding to that of Example VII. The reason for this is as follows: Although for high values of $Cl_2/CCl_4$ molal ratios the percentage of $UCl_6$ in the reaction product is quite satisfactory (e. g., 76.5% in Example VII), I have found that (other things being equal) the use of high molal ratios results in substantially lower reaction rates, so that under such circumstances the reaction slows down to a relatively impractical degree. Stated somewhat differently, other conditions including overall flow rates of the gaseous mixture remaining the same, higher molal ratios correspond to a throughput of lower quantities of $CCl_4$ per unit time in the reaction zone, and since the $CCl_4$ is necessary for the conversion of the uranium oxide, it is thus possible to set a preferred upper limit for the molal ratio of $Cl_2/CCl_4$. Generally speaking, I have found that molal ratios of not over approximately 35, and preferably not over approximately 30, give desirable rates of conversion.

As previously indicated, the rate at which the reactant gas mixture is caused to pass over the uranium oxide in the reaction zone apparently is also a factor of considerable importance, since I have found that the use of relatively high flow rates results in the comparatively rapid removal of the reaction product from the hot reaction zone, thereby minimizing the tendency of the thermally sensitive uranium hexachloride to decompose. More particularly, I have found that the introduction of chlorine and carbon tetrachloride vapor into the reaction zone in quantities sufficient to provide a total gas flow of at least approximately 1 cm. per second, and preferably approximately 1 to 7 cm. per second over the uranium oxide undergoing treatment, produces optimum results. It will be understood that in any case the flow rate is preferably such, having reference to the particle size of the uranium oxide charged to the reaction zone, that substantially no charge material is swept out of the reaction zone and into the product receiver by the flowing gases. Consequently when considering the use of relatively high flow rates, the last-mentioned precaution must always be observed, unless a high quality product is not the major objective. The particle size of the charge employed for reaction in any given instance does not appear to be particularly critical, provided of course that the precautions just mentioned are observed.

It will be understood that the chlorine gas and carbon tetrachloride vapor may be introduced into the reaction zone separately or in previously prepared admixture.

The temperature employed for the reaction may be varied over a relatively wide range, particularly desirable results having been obtained with a reaction temperature in the range of approximately 350° to 600° C., and preferably in the range of approximately 375° to 550° C. Reaction temperatures toward the upper end of the ranges mentioned are ordinarily preferred, however, in view of the resulting enhanced rate of reaction. Temperatures below or above the ranges mentioned may be employed, but in such cases the rate of reaction may become undesirably slow for practicable operation on the one hand, or undesirable side reactions may take place to a pronounced degree on the other.

The total gas pressure within the system is substantially atmospheric during the course of the conversion of uranium oxide to the hexachloride as described herein. However, if desired, subatmospheric or superatmospheric pressures may be employed without departing from the spirit of the invention.

Inert gases, such as nitrogen and carbon dioxide, may be admixed with the gaseous mixture employed for reaction purposes, if desired.

While I have thus far described my invention more particularly in connection with uranium trioxide as the charge material, uranium dioxide or uranium tritaoctaoxide, $U_3O_8$, as well as various mixtures of these oxides with each other and with uranium trioxide, may be employed in generally similar manner. For purposes of illustration, the results of two runs using uranium oxides other than trioxide are shown below in tabulated form, the procedural details being in all other respects similar to those described above in Example I:

Table II

| Example | Charge, Parts | $Cl_2$, Parts per Hour | $CCl_4$, Parts per Hour | Temp., °C. | Approx. Molal Ratio $Cl_2/CCl_4$ | Linear Velocity, cm./Sec. | Per Cent $UCl_6$ in Product (Calculated) |
|---|---|---|---|---|---|---|---|
| IX | 10($UO_2$) | 87 | 12.6 | 550 | 15.0 | 4.8 | 79.4 |
| X | 8($U_3O_8$) | 87 | 15.1 | 540 | 12.5 | 4.8 | 79.4 |

While it is generally preferred to use the oxides in relatively pure form in order to simplify the recovery of the desired reaction product, this is not absolutely essential, and uranium oxide-bearing material having a substantial content of impurities such as other metal oxides may be employed in the process without sacrificing all the advantages of the invention. However, it is generally preferred to conduct the process in the substantial absence of any solid carbonaceous material in admixture with the uranium oxide or uranium oxide-bearing material charged to the reaction zone. Also substantially anhydrous reactants, including the solid charge, are preferably employed.

In order to effect a separation and/or purification of the uranium hexachloride present in the reaction product obtained as a result of my process, I may take advantage of the relatively high volatility of uranium hexachloride and subject the composition containing the hexachloride to treatment in a suitable still, in the manner described in the above-mentioned Jenkins application or otherwise, thereby obtaining as sublimate a relatively pure uranium hexachloride. This has the added advantage that any uranium pentachloride present in the reaction product contributes to the overall yield of the hexachloride. However, other separation and/or purification methods may be employed if desired.

By way of explaining the method of analysis of the reaction products obtained according to the present process, as well as the fact that in Tables I and II above the percentage of uranium hexachloride is stated to be "calculated," the normal procedure is to analyze the reaction product (a) for total chlorine content, (b) for tetravalent uranium content and (c) for hexavalent uranium content. From each such analysis a corresponding composition of the product was calculated assuming (1) that all the $U^{+4}$ was present as $UCl_4$ and (2) that any oxychloride that might have been formed as a result of side reactions was present as $UOCl_4$. The remaining Cl and the total U$^{+6}$ were then divided between the two compounds UCl$_6$ and UOCl$_4$, and the relative amounts of each determined by simple algebraic calculations. Frequent direct analyses for UCl$_6$ by subjecting an aliquot of a given reaction product to sublimation under conditions similar to those set forth in the aforesaid Jenkins application served as a check upon the above-mentioned method of analysis, and indicated that it was sufficiently accurate (within the ordinary limits of experimental error) and reliable for present purposes.

Summarizing, my invention is based upon the discovery that a composition comprising higher chlorides of uranium having a high content of uranium hexachloride may be obtained by reacting uranium oxide, and particularly uranium trioxide, with a gaseous mixture of chlorine gas and carbon tetrachloride at an elevated reaction temperature lying in the range of approximately 350° to 600° C., and preferably in the range of approximately 375° to 550° C., with a Cl$_2$/CCl$_4$ molal ratio for the gas mixture of at least 10 and with a linear velocity for the gas mixture over the charge in the reaction zone of at least 1 cm. per second, and preferably in the range of approximately 1 to 7 cm. per second.

While I have described my invention in terms of preferred embodiments thereof, I am aware that considerable variations from the details herein disclosed might be made without departing from the true scope and spirit of the invention. Accordingly, the invention is to be limited only by the claims set forth hereinafter.

I claim:

1. A process for preparing uranium hexachloride comprising reacting an oxide of uranium with a gaseous mixture of chlorine and carbon tetrachloride, there being at least a substantial content of each of these components in the gaseous mixture, under conditions such that a product having a high content of uranium hexachloride is produced, and recovering uranium hexachloride from the reaction product.

2. A process for preparing uranium hexachloride comprising reacting uranium trioxide with a gaseous mixture of chlorine and carbon tetrachloride, there being at least a substantial content of each of these components in the gaseous mixture, under conditions such that a product having a high content of uranium hexachloride is produced, and recovering uranium hexachloride from the reaction product.

3. A process including the preparation of a mixture of uranium pentachloride and uranium hexachloride comprising reacting an oxide of uranium with a gaseous mixture which comprises chlorine and carbon tetrachloride, there being at least a substantial content of each of these components in the gaseous mixture, under conditions such that the reaction product is predominantly uranium hexachloride, and recovering uranium hexachloride from the reaction product.

4. A process including the preparation of a mixture of uranium pentachloride and uranium hexachloride comprising reacting uranium trioxide with a gaseous mixture which comprises chlorine and carbon tetrachloride, there being at least a substantial content of each of these components in the gaseous mixture, under conditions such that the reaction product is predominantly uranium hexachloride, and recovering uranium hexachloride from the reaction product.

5. A process for the preparation of uranium hexachloride comprising reacting an oxide of uranium with a gaseous mixture of chlorine and carbon tetrachloride at an elevated temperature, the gaseous mixture having at least a substantial content of carbon tetrachloride, a Cl$_2$/CCl$_4$ molal ratio of at least approximately 10 and a linear velocity over the charge in the reaction zone of at least approximately 1 cm. per second but not so high as to sweep any substantial portion of the charge material out of the reaction zone, and recovering uranium hexachloride from the reaction product.

6. A process for the preparation of uranium hexachloride comprising reacting uranium trioxide with a gaseous mixture of chlorine and carbon tetrachloride at an elevated temperature, the gaseous mixture having at least a substantial content of carbon tetrachloride, a Cl$_2$/CCl$_4$ molal ratio of at least approximately 10 and a linear velocity over the charge in the reaction zone of at least approximately 1 cm. per second but not so high as to sweep any substantial portion of the charge material out of the reaction zone, and recovering uranium hexachloride from the reaction product.

7. A process comprising reacting an oxide of uranium with a gaseous mixture of chlorine and carbon tetrachloride in which the content of carbon tetrachloride is at least substantial and in which the Cl$_2$/CCl$_4$ molal ratio is at least approximately 10 and in which the linear velocity of the gaseous mixture over the charge in the reaction zone is at least approximately 1 cm. per second but not so high as to sweep any substantial portion of the charge material out of the reaction zone, and at a reaction temperature in the range of approximately 350° to 600° C., and recovering uranium hexachloride from the reaction product.

8. A process comprising reacting uranium trioxide with a gaseous mixture of chlorine and carbon tetrachloride in which the content of carbon tetrachloride is at least substantial and in which the Cl$_2$/CCl$_4$ molal ratio is at least approximately 10 and in which the linear velocity of the gaseous mixture over the charge in the reaction zone is at least approximately 1 cm. per second but not so high as to sweep any substantial portion of the charge material out of the reaction zone, and at a reaction temperature in the range of approximately 350° to 600° C., and recovering uranium hexachloride from the reaction product.

9. A process comprising reacting an oxide of uranium with a gaseous mixture of chlorine and carbon tetrachloride in which the Cl$_2$/CCl$_4$ molal ratio is in the range of approximately 15 to 30 and in which the linear velocity of the gaseous mixture over the charge in the reaction zone is in the range of approximately 1 to 7 cm. per second, and at a reaction temperature in the range of approximately 375° to 550° C., and recovering uranium hexachloride from the reaction product.

10. A process comprising reacting uranium trioxide with a gaseous mixture of chlorine and carbon tetrachloride in which the Cl$_2$/CCl$_4$ molal ratio is in the range of approximately 15 to 30 and in which the linear velocity of the gaseous mixture over the charge in the reaction zone is in the range of approximately 1 to 7 cm. per second, and at a reaction temperature in the range of approximately 375° to 550° C., and recovering uranium hexachloride from the reaction product.

11. A process for the preparation of uranium hexachloride comprising reacting an oxide of uranium at an elevated reaction temperature with a gaseous mixture of chlorine and carbon tetrachloride in which the content of carbon tetrachloride is at least substantial and in which the Cl₂/CCl₄ molal ratio is at least approximately 10 and in which the linear velocity of the gaseous mixture over the charge in the reaction zone is sufficiently high to sweep the product uranium hexachloride from the hot reaction zone without decomposition of any substantial portion thereof, but not so high as to sweep any substantial portion of the charge material out of the reaction zone, and recovering uranium hexachloride from the reaction product.

12. A process for the preparation of uranium hexachloride comprising reacting uranium trioxide at an elevated reaction temperature with a gaseous mixture of chlorine and carbon tetrachloride in which the content of carbon tetrachloride is at least substantial and in which the Cl₂/CCl₄ molal ratio is at least approximately 10 and in which the linear velocity of the gaseous mixture over the charge in the reaction zone is sufficiently high to sweep the product uranium hexachloride from the hot reaction zone without decomposition of any substantial portion thereof, but not so high as to sweep any substantial portion of the charge material out of the reaction zone, and recovering uranium hexachloride from the reaction product.

HAROLD G. REIBER.

REFERENCES CITED

The following references are of record in the file of this patent:

Mellor: "Comprehensive Treatise on Inorganic and Theoretical Chemistry," vol. 12, 1932, page 57 (Quantin: Comp. Rend., 1888, vol. 106, pages 1074–1075).

Rideal: J. Soc. Chem. Ind., 1914, vol. 33, pages 673–674, Otto Ruff and Alfred Heinzelmann, Danzig.

Z. Anorg. Chem., 72, pages 63–84 (Chem. Abst. vol. V, 1911, page 3772).